US009701437B2

(12) United States Patent
Bugas et al.

(10) Patent No.: US 9,701,437 B2
(45) Date of Patent: Jul. 11, 2017

(54) REPULPABLE CORRUGATED BOX WITH STYRENE-ACRYLIC COPOLYMER AND HYDROGENATED TRIGLYCERIDE COATING

(71) Applicant: INTERSTATE CORRPACK LLC, Cambridge, MD (US)

(72) Inventors: Pete Bugas, Salisbury, MD (US); Lawrence C. Nykwest, Bernville, PA (US); Scott Stoltzmann, Federalsburg, MD (US)

(73) Assignee: Indevco Plastics, Inc., Doswell, VA (US)

( * ) Notice: Subject to any disclaimer, the term of this patent is extended or adjusted under 35 U.S.C. 154(b) by 486 days.

(21) Appl. No.: 13/815,398

(22) Filed: Feb. 28, 2013

(65) Prior Publication Data

US 2014/0239052 A1    Aug. 28, 2014

Related U.S. Application Data

(63) Continuation-in-part of application No. 12/320,429, filed on Jan. 26, 2009, now Pat. No. 8,455,068.

(51) Int. Cl.
*B65D 5/56* (2006.01)
*B32B 29/00* (2006.01)
(Continued)

(52) U.S. Cl.
CPC .............. *B65D 5/563* (2013.01); *B31B 17/00* (2013.01); *B31F 1/2845* (2013.01); *B32B 3/28* (2013.01); *B32B 7/12* (2013.01); *B32B 29/005* (2013.01); *B32B 29/08* (2013.01); *B65D 85/50* (2013.01); *B32B 2250/26* (2013.01); *B32B 2255/12* (2013.01); *B32B 2255/26* (2013.01);
(Continued)

(58) Field of Classification Search
CPC . B65D 5/563; B31F 1/2845; Y10T 156/1052; Y10T 428/24661; B32B 2250/26; B32B 2255/12; B32B 2255/26; B32B 2260/028; B32B 2260/046; B32B 2307/7163; B32B 2317/127; B32B 2439/00; B32B 2439/70; B32B 29/005; B32B 29/08; B32B 3/28; B32B 7/12; B31B 17/00
USPC ........ 428/178, 182; 156/250, 278; 229/5.81; 493/56
See application file for complete search history.

(56) References Cited

U.S. PATENT DOCUMENTS

| | | | |
|---|---|---|---|
| 2,840,138 A | 6/1958 | Johnston et al. | |
| 3,691,002 A | 9/1972 | Blandy | |
| 4,752,637 A | 6/1988 | Israel | |
| 5,763,100 A * | 6/1998 | Quick et al. | ......... 428/486 |
| 5,858,551 A | 1/1999 | Salsman | |
| 5,868,309 A | 2/1999 | Sandstrom et al. | |
| 6,001,286 A | 12/1999 | Sleeter | |
| 6,066,379 A | 5/2000 | Ma et al. | |
| 6,103,308 A | 8/2000 | Floyd et al. | |
| 6,113,981 A | 9/2000 | Ogilvie, Jr. et al. | |
| 6,201,053 B1 | 3/2001 | Dieckmann et al. | |
| 6,541,556 B1 | 4/2003 | Berube | |
| 6,554,899 B1 | 4/2003 | Ogilvie, Jr. et al. | |
| 6,811,824 B2 | 11/2004 | Hassan et al. | |

(Continued)

FOREIGN PATENT DOCUMENTS

WO    WO 96/00815    1/1996

*Primary Examiner* — Yan Lan
(74) *Attorney, Agent, or Firm* — John S. Hale; Gipple & Hale

(57) ABSTRACT

A repulpable moisture resistant poultry box having a composite structure with a fluted medium, a top backing board secured to one side of the fluted medium and a bottom backing board secured to the other side of the fluted medium. The backing boards and the fluted medium are impregnated with a hydrogenated triglyceride. The backing boards each have an outer surface coated with an emulsion of hydrogenated triglyceride and styrene acrylic to provide moisture resistance repulpable and recyclable box.

21 Claims, 2 Drawing Sheets

(51) Int. Cl.
  *B32B 38/08* (2006.01)
  *B32B 3/28* (2006.01)
  *B31B 1/16* (2006.01)
  *B31F 1/28* (2006.01)
  *B31B 17/00* (2006.01)
  *B32B 7/12* (2006.01)
  *B32B 29/08* (2006.01)
  *B65D 85/50* (2006.01)

(52) U.S. Cl.
  CPC ... *B32B 2260/028* (2013.01); *B32B 2260/046* (2013.01); *B32B 2307/7163* (2013.01); *B32B 2317/127* (2013.01); *B32B 2439/00* (2013.01); *B32B 2439/70* (2013.01); *Y10T 156/1052* (2015.01); *Y10T 428/24661* (2015.01)

(56) References Cited

U.S. PATENT DOCUMENTS

| | | |
|---|---|---|
| 6,846,573 B2 | 1/2005 | Seydel |
| 7,235,308 B2 | 6/2007 | Druckrey et al. |
| 7,425,246 B2 | 9/2008 | Urscheler |
| 7,595,115 B2 | 9/2009 | Berube |
| 8,597,733 B2 | 12/2013 | Vonfelden |
| 2002/0169250 A1 | 11/2002 | Ishihara |
| 2003/0162044 A1 | 8/2003 | Tamura et al. |
| 2010/0189961 A1* | 7/2010 | Bugas et al. .......... 428/182 |
| 2013/0260162 A1 | 10/2013 | Fickert et al. |

* cited by examiner

REPULPABLE CORRUGATED BOX WITH STYRENE-ACRYLIC COPOLYMER AND HYDROGENATED TRIGLYCERIDE COATING

RELATED APPLICATIONS

This is a continuation-in-part application of U.S. patent application Ser. No. 12/320,429 filed Jan. 26, 2009.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

None.

FIELD OF THE INVENTION

The present invention generally relates to moisture resistant and water proof paper products including linerboard and corrugated board. Particularly, this invention relates to moisture resistant paper boxes used primarily in the poultry industry that are waterproofed and can be repulped and recycled to be part of the feedstock for new paper products that minimizes environmental concerns.

BACKGROUND OF THE INVENTION

In the manufacture of paper and paperboard and of products made from same, petroleum derived paraffin waxes and synthetic polymers have been used for many years as moisture retardants, water repellents, oil repellents, stiffeners, strengtheners, and release agents. Besides paraffin, the material used most often in such products is polyethylene. However, other widely used polymers in the field include polymerized acrylics, vinyls, styrenes, ethylenes and copolymers or hetero-polymers of these monomers. The paper and paperboard to which these traditional materials are applied is difficult and often impossible to repulp and recycle in standard paper mill processes because the petroleum derived polymers and, particularly, the petroleum waxes are non-biodegradable in mill white waters (circulated process waters) and discharge effluents. Furthermore, the residue of the petroleum waxes that is not removed from pulp fibers during the repulping and recycling processes causes severe problems due to buildup that occurs on the screens and felts used during the process of forming and making the paper or paperboard sheet. In addition, paper and paperboard coated or impregnated with petroleum waxes resist biodegradation and composting when disposed of in landfills and other waste disposal systems. Paper and paperboard coated or impregnated with traditional synthetic polymers and heteropolymers are also difficult and often impossible to repulp and recycle owing to their resistance to separation from the fiber in the standard repulping processes resulting in significant fiber losses in efforts to repulp and recycle them, and these are also non-biodegradable and therefore resist composting.

Water repellent packaging currently utilizes petroleum based liquid polymers or polymer film laminates (including polyethylene or similar film laminates such as polyolefin, polyester, polyvinyl alcohol, polyvinyl acetate, polystyrene, polypropylene, and the like) which are recyclable after extensive treatment, All of these laminates require the installation of specialized repulping machinery that separates the pulp fibers from the laminated films and/or is far more expensive in terms of operating costs and/or recycled pulp fiber yields. The action of separating the fiber from the film damages some fibers causing them to be selected out of the recycled pulp and presented for reuse, and the separated film waste carries some of the fibers out of the repulpate when its adherence is not interrupted by the repulping process. Likewise, coatings and impregnating products made from or based on paraffin waxes and/or similar petroleum derivatives can be repulped for recycling in specially configured repulping equipment that removes and separates the paraffin waxes; however, as in the laminated film repulping process, the more intense physical and chemical requirements of this repulping process coupled with the lost fibers that become trapped in paraffin wax wastes cause the recyclable repulped fiber levels to fall far below those of standard repulping processes. Moreover, boxes made from such products are not biodegradable and must be separated and deposited in separate landfill areas.

The poultry box industry currently uses a wax to coat the boxes (EVA—poly (ethylene vinyl acetate) which takes a significantly long period of time to compost and leaves a chemical residue from those compounds. There appears to be little or no decomposition of higher molecular weight resin and EVA fractions.

In the prior art, a number of patents have attempted to address the above noted problem. U.S. Pat. No. 6,103,308 issued Aug. 15, 2000 is directed toward a paper and paperboard coating composition using vegetable oil triglyceride as a paper coating while U.S. Pat. No. 6,201,053 issued Mar. 13, 2001 is directed toward various triglycerides mixed with catalysts for use as a waterproofing agent on paper coating.

U.S. Pat. No. 6,846,573 issued Jan. 25, 2005 discloses the use of hydrogenated triglycerides having a melting point above 50° as a coating material for the surface of paper products to improve wet strength and moisture resistance in addition to being repulpable.

The use of tallow to treat paper is also well known in the prior art. U.S. Pat. No. 2,840,138 issued Jun. 24, 1958 discloses the use of tallow fatty acids to impregnate and penetrate corrugated paper material to provide a wilt resistant material. Also, U.S. Pat. No. 4,752,637 issued Jun. 21, 1988 is directed to a method of treating fiberboard to have superior moisture resistance with various mixtures of hydroxy terminated esters such as tallow.

None of the noted references have provided a repulpable, recyclable corrugated box capable of holding iced products and being moisture resistant.

SUMMARY OF THE INVENTION

The present invention is directed to a backed corrugated paper box product which has the outer paper liner or backer sheet surfaces coated with a homogenized styrene/acrylic hydrogenated triglyceride emulsion with the inner corrugated paper medium and liner sheets being impregnated with a hydrogenated triglyceride such as tallow.

Hydrogenated tallow triglycerides can be applied in the same manner as the traditional petroleum waxes and synthetic polymers and function as moisture retardants, water repellents, oil repellents, stiffeners, strengtheners, and release agents in the manufacture of paper, paperboard, packaging, molding forms, and other common applications. A particular advantage is that such hydrogenated tallow triglycerides are readily biodegradable in paper mill white waters and is compostable in landfill or other waste disposal systems. The present invention is easier to repulp and recycle without detriment to production equipment, processes, or manufactured product quality or performance.

It is an object of this invention to produce a paper product which can be repulped and recycled.

It is another object of the invention to provide a poultry box which is biodegradable.

It is still another object of the invention to provide a poultry box which has superior moisture resistance.

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
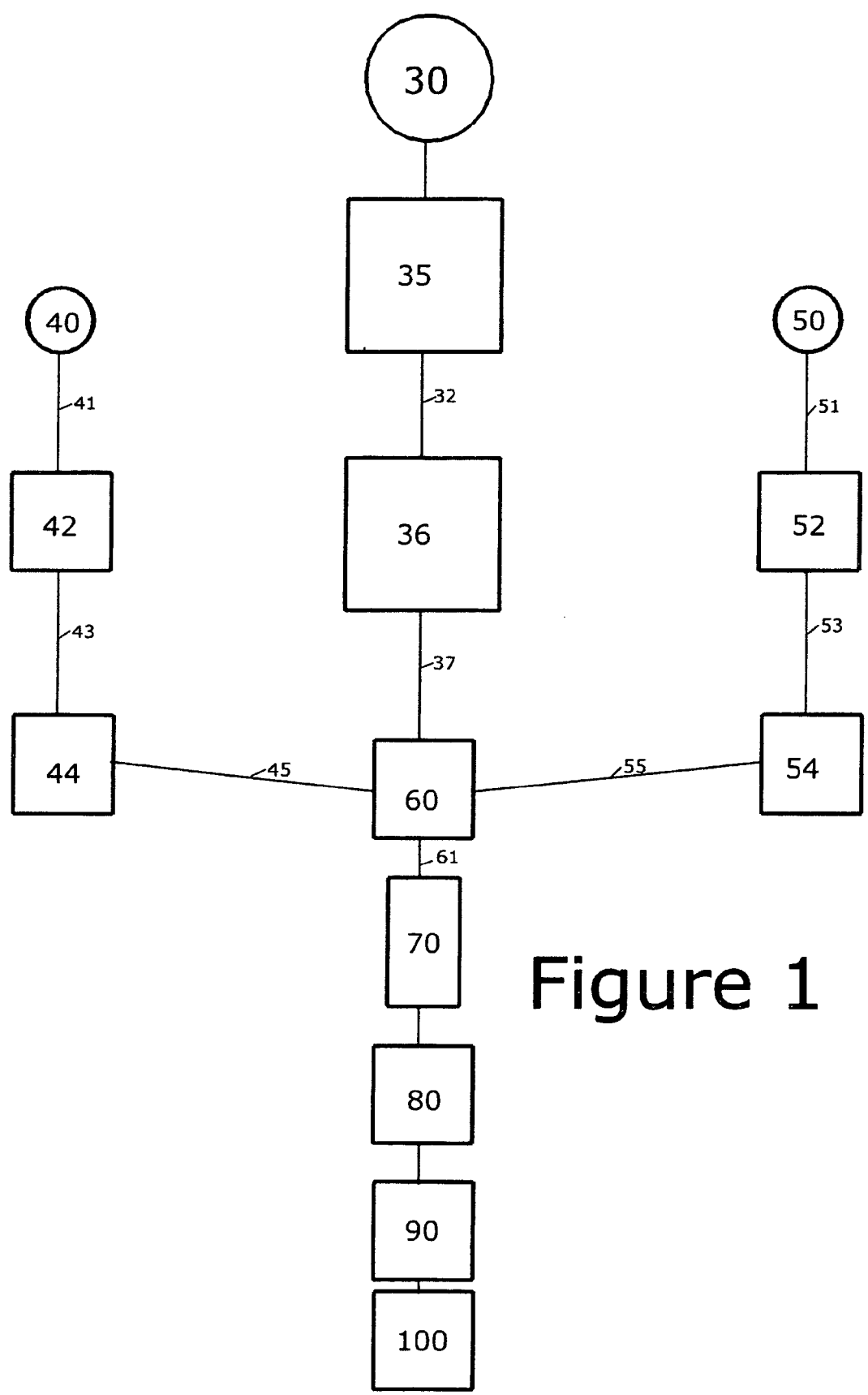
FIG. 1 is a schematic of the process used in making the poultry box composite material.
Figure 2:
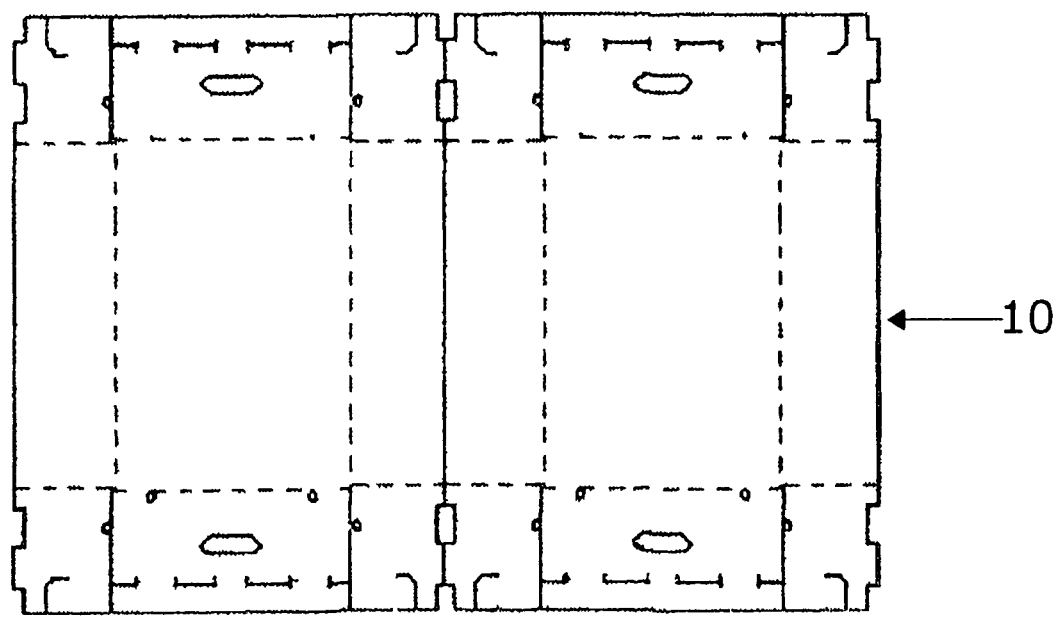
FIG. 2 is a top plan view of the inventive poultry box invention.
Figure 3:
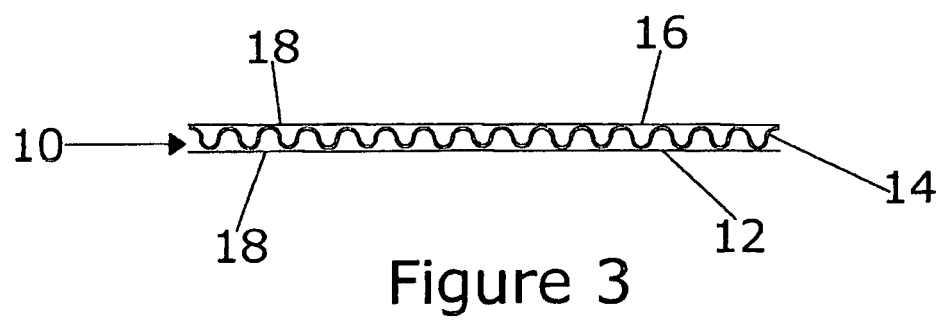
FIG. 3 is an enlarged cross sectional view of the inventive poultry box invention.

The preferred embodiments and best mode of the invention are shown in FIGS. 1 through 3. While the invention is described in connection with certain preferred embodiments, it is not intended that the present invention be so limited. On the contrary, it is intended to cover all alternatives, modifications, and equivalent arrangements as may be included within the spirit and scope of the invention as defined by the appended claims.

DEFINITIONS

As used herein the following abbreviations and terms are understood to have the meanings as set forth:

"Triglyceride" includes both animal fats and vegetable oils and is derived from one or both of them. Animal fats include beef tallow, pork lard, poultry grease and fish oils. Vegetable oils include soybean oil, peanut oil, olive oil, palm oil, coconut oil and cottonseed oil.

"Paraffin" is a wax-like product derived from petroleum.

"Paper" includes substrates and surfaces of cellulosic material.

It has been found that hydrogenated triglycerides and preferably lard or tallow triglycerides can be substituted for petroleum based paraffin waxes and wax compounds in the manufacturer of paper products. All of these application systems involve melted triglycerides held at temperatures in the range from around 125° F. to 170° F. which is either squeezed, rolled, cascaded, sprayed, or doctored onto the linerboard, paper, carton stock, or corrugated medium surface to impregnate the same.

The method and machinery or equipment for repulping and recycling scrap paper in the paper and paperboard or liner board industry is both an established and well known art, and the equipment required is standard and commonly installed at most mills incorporating recycled paper in their manufacturing feed stocks. Thus, those skilled in the paper making art are also knowledgeable in re-pulping and recycling.

Poultry boxes are unique paper products that need to withstand water and poultry fluid. The present inventive poultry box is made of double backer corrugated board having a corrugated medium of 30 to 40 lb./1000 sq. ft. (MSF) paperboard of an "A", "B", "C", "E" and "F" flute size (weight depends upon various external factors). The preferred flute size used in the invention is an "A" flute having 33+/−3 flutes per lineal foot with a flute thickness of ⅜ inch or a "C" flute having 39+/−3 flutes per lineal foot with a flute thickness of 5/32 inch. A flat liner or backer board of Kraft paper (various grades) is adhered to one side of the fluted medium with a starch based adhesive and a second flat liner or backer board of Kraft paper is adhered to the other side of the fluted medium with a starch based adhesive to form a backed corrugated board. The Kraft paperboard liner may be bleached white, coated white (white coat), mottled white or colored. As is well known in the art, the medium paper is humidified by means of high pressure steam which softens the paper fibers to facilitate the formation of the flute and consequent gluing. After formation of the board, this humidity is removed by drying in the dry-end. In the present invention, the newly formed corrugated liner board is heated from the bottom by hot plates and the adhesive holding components of the structure is cured.

The present repulpable inventive degradable poultry box 10 is constructed with an inner Kraft paper liner or backer 12 impregnated with a hydrogenated triglyceride, preferably tallow at 2.5 lbs/MSF, a corrugated paper medium 14 impregnated with a hydrogenated triglyceride, preferably tallow at 3.5 lbs/MSF and the outer Kraft paper liner or backer 16 is impregnated with tallow at 2.5 lbs/MSF. Other triglycerides can be used such as animal fats and vegetable oils. Animal fats include beef tallow, pork lard, poultry grease and fish oils. Vegetable oils include soybean oil, peanut oil, olive oil, palm oil, coconut oil and cottonseed oil. Tallow used in the impregnation is commercially available from C.J. Robinson Co. and Chemol Corporation. After tallow impregnation of the paper liners, both liners or backers 16 are coated on their outside surfaces with a coating 18 of a styrene acrylic co-polymer water based solution ranging from about 75% to about 95% by weight mixed or blended with hydrogenated triglyceride preferably in the nature of tallow ranging from about 5% to about 25% by weight to form an emulsified coating. A most preferred embodiment of the coating 18 is about 80% by weight styrene acrylic co-polymer solution and about 20% by weight hydrogenated triglyceride which is preferably in the form of tallow. The coating emulsion is heated and mixed at the general time of application and heated to a temperature from about 160° F. to about 180° F., preferably at 170° F.

The coating 18 is a water based high solid fluid solution (% by weight of the styrene acrylic co-polymer ranging from about 50% to about 55%) most preferably about 52% and has a pH ranging from about 8-9 with fully cured Tg of +7, a specific gravity of ranging from about 1.04 to about 1.6 and viscosity (cps) of about 400, a vapor density the same as water with 30 minute Cobb values of 10 or better. The coating is fast drying, recyclable, repulpable and is printable and glueable.

The present poultry box 10 is constructed using standard corrugated box making machinery as is well known in the art. A roll of the medium paper 30 is positioned upstream of the corrugator. The paper is wetted and passed through a standard corrugating machine 35 and formed into a corrugated medium 32 having the desired flute size, preferably "A" or "C". The corrugated medium 32 is transported downstream through a tallow bath 36 and rollers with the corrugated medium being impregnated with tallow at 2.5 to 3.5 lbs/MSF. The impregnated corrugated medium 37 is carried by belts to an assembly station 60 where the coated liner backers 45 and 55 as further described below are secured to the corrugated medium 37 to form a composite sheet poultry box carton blank. Two liner rolls of roll stock of Kraft paper 40 and 50 are removed from the respective rolls and the respective liner sheets 41 and 51 are transported by rollers through separate hydrogenated triglyceride, preferably tallow baths 42 and 52 and their associated rollers which applies tallow to the liner backer sheets 41 and 51 at 2.5 lbs/MSF impregnating the same. The now impregnated liner backer sheets 43 and 53 are then transported by rollers to and coated at coating stations 44 and 54 on a single sheet surface side with the emulsion coating 18 heated to about 170° F. The emulsion coating can be placed on the sheet backing surface by rollers, doctor blades or spraying as is well known in the art. The coating is translucent to milky white and is water based. The coated liner sheets 45 and 55 are then glued at gluing station 60 to the corrugated medium 37 with a suitable adhesive as is well known in the art to form a coated corrugated composite board with emulsified coating 18 on its top and bottom outside surfaces. The coated corrugated composite board 61 is then passed over a heat curing bed 70 to cure and set the adhesive or glue. The heat curing bed 70 is a series of hot plates and pressure rollers which applies light pressure and heat to cure the adhesive which is standard in the corrugated box making art and the glue cures very rapidly. The composite board is run through a chill plate assembly 80 which drops the corrugated temperature 70° F. allowing the blanks to be stacked without sticking. The composite corrugated board sheet 61 is then cut into individual blank sections in a cutting and stacking station 90 with known means stacking the individual flat sheets of composite corrugated board. If desired, air impact dryers 100 can be used to dry the flat sheets. The individual composite corrugated blanks are stacked and dried for a day. The blanks are later placed in a standard box cutting station which cuts and scores the composite poultry box 10 in the form shown in FIG. 2.

The poultry boxes are then delivered and assembled at the poultry packing plant and an adhesive provided by the manufacturer is placed vertically along the poultry box to provide a structurally sound moisture proof poultry box 10.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims:

What we claim is:

1. A repulpable moisture resistant paper product without wax content comprising a composite corrugated paper structure with a fluted medium, a top paper backing liner secured to one side of said fluted medium and a bottom paper backing liner secured to the other side of said fluted medium, with at least one of said paper backing liners and said fluted medium being impregnated with a hydrogenated triglyceride or a blend of natural, partially and fully hydrogenated triglycerides, at least one of said impregnated paper backing liners having an outer surface coated with an emulsified mixture of styrene acrylic copolymer and hydrogenated triglyceride to provide moisture resistance and wet strength to said paper product, said paper product being repulpable, recyclable and compostable.

2. The repulpable moisture resistant paper product of claim 1 wherein the hydrogenated triglyceride is tallow.

3. The repulpable moisture resistant paper product of claim 2 wherein said tallow is about 20% by weight of said emulsified mixture.

4. The repulpable moisture resistant paper product of claim 1 wherein the hydrogenated triglyceride is a hydrogenated vegetable oil selected from the group consisting of soybean oil, peanut oil, olive oil, palm oil, coconut oil and cottonseed oil.

5. The repulpable moisture resistant paper product of claim 1 wherein the hydrogenated triglyceride is an animal fat selected from the group consisting of beef tallow, pork lard, poultry grease, and fish oils.

6. The repulpable moisture resistant paper product of claim 1 wherein the emulsified coating mixture ranges from about 75% to about 95% by wet coating weight of styrene acrylic copolymer with the remainder by weight being hydrogenated triglyceride.

7. The repulpable moisture resistant paper product of claim 6 wherein said emulsified coating is applied to the outer surfaces of said paper backing liners at a wet coating weight in a range of about 1.0 to about 2.0 lbs. per thousand square feet of liner board surface.

8. The repulpable moisture resistant paper product of claim 1 wherein the paper product is a recyclable moisture resistant corrugated poultry box.

9. The repulpable moisture resistant paper product of claim 1 wherein said fluted medium has a "C" flute size.

10. The repulpable moisture resistant paper product of claim 1 wherein said fluted medium has an "A" flute size.

11. The repulpable moisture resistant paper product of claim 1 wherein the hydrogenated triglyeerlde is palm oil.

12. A waxless repulpable recyclable moisture resistant paper box intended for use in wet food processing conditions comprising a corrugated paper product having a composite structure with a fluted medium and liner sheets secured to each side of said medium, said liner sheets and fluted medium being impregnated with animal hydrogenated triglyceride and said liner sheet's outer surfaces being coated with an emulsified mixture of styrene acrylic copolymer and hydrogenated triglyceride, said coating having a hydrogenated triglyccride content ranging from about 5% to about 25% by wet coating weight and a pH ranging from about 8 to about 9, imparting improved moisture resistance and wet strength to said paper box allowing said paper box to be repulpable and recyclable.

13. The repulpable paper box of claim 12 wherein said animal hydrogenated triglyceride is an animal fat selected from the group consisting of beef tallow, pork lard, poultry grease, and fish oils.

14. The repulpable paper box of claim 12 wherein said emulsified coating mixture is at least 75% by weight styrene acrylic solution with the remainder by weight being animal hydrogenated triglyceride.

15. The repulpable paper box of claim 12 wherein said emulsified coating mixture is applied to the outer surfaces of said paper liner sheets at a coating weight in a range of about 1.0 to about 2.0 lbs. per thousand square feet of liner surface.

16. The repulpable poultry box of claim 12 wherein said paper box is a moisture resistant poultry box.

17. A wax-free repulpable recyclable moisture resistant poultry box comprising a corrugated paper composite structure with a paper fluted medium and paper liner sheets secured to each side, said paper liner sheets and paper fluted medium being impregnated with tallow ranging from about 2.5 to about 3.5 lbs/MSF with at least one of said paper liner sheet's outer surfaces being coated with an emulsion of about 80% styrene acrylic mixed in water by weight and about 20% tallow by weight, said emulsion coating imparting improved moisture resistance and wet strength to said poultry box.

18. The repulpable poultry box of claim 17 wherein said fluted medium has a "C" flute size.

19. The repulpable poultry box of claim 17 wherein said fluted medium has an "A" flute size.

20. A waxless repulpable, recyclable and compostable moisture resistant corrugated paper poultry box intended for use in wet food processing conditions comprising a corrugated paper box having a composite structure with a fluted medium and liner sheets secured to each side of said fluted medium, said liner sheets and fluted medium being impregnated with a hydrogenated triglyceride vegetable oil, namely, palm oil and said liner sheet's outer surfaces are wet coated with an emulsified mixture of styrene acrylic copolymer based solution ranging from about 75% to about 95% by weight and hydrogenated triglyceride vegetable oil, namely, palm oil ranging from about 5% to about 25% by weight, in a range of about 1.0 to about 2.0lbs. weight per thousand square feet of liner surface, said coating imparting improved moisture resistance and wet strength to said corrugated paper poultry box.

21. A waxless repulpable recyclable moisture resistant poultry box comprising a corrugated paper composite structure with a paper fluted medium and paper liner sheets secured to each side of said fluted medium, said paper liner sheets and paper fluted medium being impregnated with palm oil ranging from about 2.5 to about 3.5 lbs/MSF with at least one of said paper liner sheet's outer surfaces being coated with an emulsion of about 80% styrene acrylic mixed in water by weight and about 20% palm oil by weight, said emulsion coating imparting improved moisture resistance and wet strength to said poultry box.

\* \* \* \* \*